United States Patent
Ookubo et al.

(10) Patent No.: US 7,248,019 B2
(45) Date of Patent: Jul. 24, 2007

(54) CORDLESS POWER TOOL

(75) Inventors: Shinichi Ookubo, Tokyo (JP); Atsushi Matsuoka, Tokyo (JP); Syuichi Ishii, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 10/538,010

(22) PCT Filed: Nov. 17, 2003

(86) PCT No.: PCT/JP03/14585

§ 371 (c)(1),
(2), (4) Date: Jun. 3, 2005

(87) PCT Pub. No.: WO2004/050307

PCT Pub. Date: Jun. 17, 2004

(65) Prior Publication Data

US 2006/0108980 A1 May 25, 2006

(30) Foreign Application Priority Data

Dec. 4, 2002 (JP) .............................. 2002-352990

(51) Int. Cl.
*H02J 7/00* (2006.01)
(52) U.S. Cl. ....................................... 320/114; 320/112
(58) Field of Classification Search ................ 320/114, 320/112, 107, 167, 117; 307/150
See application file for complete search history.

(56) References Cited

U.S. PATENT DOCUMENTS

| 5,831,420 | A | * | 11/1998 | Myers ........................ 323/282 |
| 6,016,049 | A | * | 1/2000 | Baughman et al. .......... 320/167 |
| 6,373,152 | B1 | * | 4/2002 | Wang et al. ................. 307/150 |
| 6,525,511 | B2 | * | 2/2003 | Kubale et al. ............... 320/112 |

FOREIGN PATENT DOCUMENTS

| JP | 6-679-4 | 1/1994 |
| JP | 9-285006 | 10/1997 |
| JP | 10-29172 | 2/1998 |
| JP | 2002-142375 | 5/2002 |

OTHER PUBLICATIONS

Machine translation of JP-09285006.*
Machine translation of JP-2002142375.*

* cited by examiner

*Primary Examiner*—Karl Easthom
*Assistant Examiner*—Aaron Piggush
(74) *Attorney, Agent, or Firm*—Morgan, Lewis & Bockius LLP

(57) ABSTRACT

A cordless power tool such as a power staple gun 1 includes a power supply circuit of an electric double layer capacitor 8 and a lithium-ion battery 11. In a standby state, the lithium-ion battery charges the electric double layer capacitor, and at a switch on time, the electric double layer capacitor supplies large current to the motor 5. By combining the lithium-ion battery with high energy density and the electric double layer capacitor capable of discharging large current, it is possible to greatly reduce the size and weight as compared with a case where a nickel-cadmium battery or a nickel-hydrogen battery is used. Besides, since the electric double layer capacitor has a very long lifetime, the running cost can also be reduced.

6 Claims, 3 Drawing Sheets

CORDLESS POWER TOOL

TECHNICAL FIELD

The present invention relates to a cordless power tool, and particularly to a cordless power tool in which the size and weight of a power supply part is reduced.

BACKGROUND ART

Conventionally, a cordless power tool generally uses a battery pack of a nickel-cadmium battery, a nickel-hydrogen battery or the like as a drive power supply, and when the secondary battery mounted on a cordless power tool main body is exhausted, the cordless power tool is connected to a dedicated recharger, or the battery pack removed from the cordless power tool is charged and is repeatedly used (for example, see JP-UM-A-06-000679, JP-A-10-029172).

In the conventional cordless power tool, since the weight of the secondary battery relative to the main body is heavy, and charging takes time, it is desired to reduce the size and weight of the power supply and to shorten the charging time. Besides, the conventional secondary battery has a charge/discharge lifetime of approximately several hundred to one thousand cycles, which is generally shorter than the lifetime of the power tool main body, and is exchanged with a new one at the time when the performance degrades, and accordingly, the running cost becomes high.

DISCLOSURE OF THE INVENTION

Thus, in order to reduce the size and weight of a cordless power tool, to shorten the charging time, and to reduce the running cost, there arise technical problems to be solved, and the invention has an object to solve the above problems.

The invention is proposed to achieve the above object, and provides a cordless power tool including an electric double layer capacitor as a power supply of a motor of the cordless power tool, in which a charging electrode for the electric double layer capacitor is provided in a tool main body, and the electric double layer capacitor can be charged by an external recharger.

Moreover, there is provided a cordless power tool including a plurality of electric double layer capacitors as a power supply of a motor of the cordless power tool, in which a charging electrode for the electric double layer capacitors is provided in a tool main body, and the electric double layer capacitors can be charged by an external recharger, and further, a series parallel switching circuit to switch connection of the plurality of electric double layer capacitors between series and parallel according to a state of a start switch is provided, and when the start switch is off, the series parallel switching circuit switches the plurality of electric double layer capacitors into the parallel connection, and when the start switch is on, the series parallel switching circuit switches the plurality of electric double layer capacitors into the series connection to supply current to the motor.

Moreover, there is provided a cordless power tool in which a secondary battery is disposed in parallel to the electric double layer capacitors, and when the start switch is off, the secondary battery charges the electric double layer capacitors, and when the start switch is on, the electric double layer capacitors supply the current to the motor.

Moreover, there is provided a cordless power tool in which the secondary battery is a small secondary battery such as a lithium ion battery.

Figure 1:
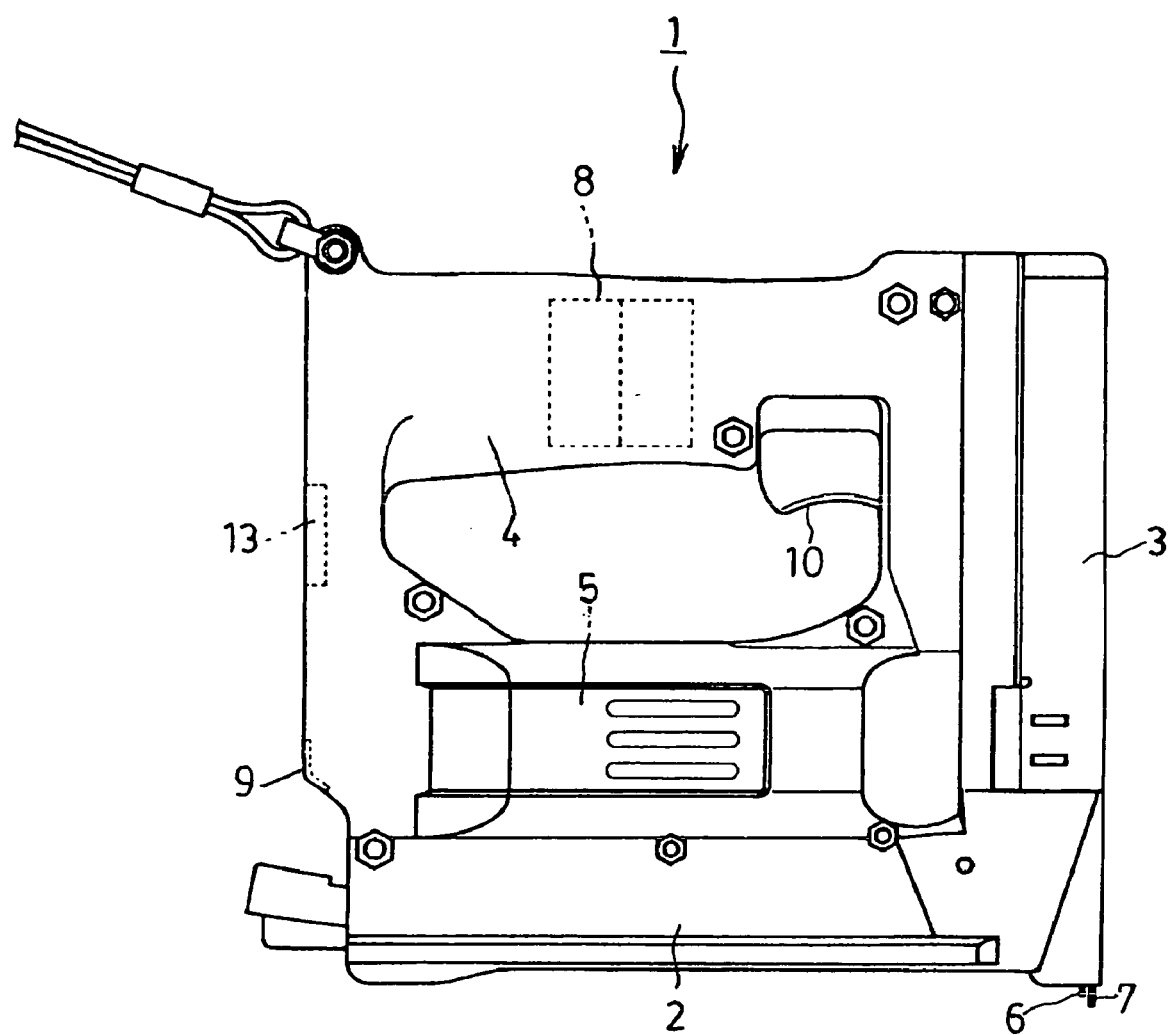
FIG. 1 shows an embodiment of the invention and is a side view of a cordless power tool.

Incidentally, in the drawings, reference numeral 1 denotes a power staple gun; 2, a staple magazine part; 3, a driver mechanism part; 4, a grip part; 5, a DC motor; 6, a driver; 7, a contact arm; 8, an electric double layer capacitor; 9, a charging electrode; 10, a trigger lever; 11, a lithium-ion battery; 12, a battery cover; and 13, a main switch.

BEST MODE FOR CARRYING OUT THE INVENTION

Hereinafter, an embodiment of the invention will be described in detail with reference to the drawings. FIG. 1 shows a power staple gun 1 as an example of a cordless power tool, in which a lower part of a housing is a staple magazine part 2, a driver mechanism part 3 is vertically disposed at the front part (right in the drawing), and a grip part 4 extends rearward from the upper back of the driver mechanism part 3. A DC motor 5 is disposed on the staple magazine part 2, and drives the driver mechanism part 3 through a reduction gear mechanism and a cam mechanism (not shown).

The driver mechanism part 3 includes a driver 6 for driving a staple and a contact arm 7 as a safety mechanism, and the contact arm 7 protrudes downward from the lower end of the driver mechanism part 3. Incidentally, in the drawing, although the driver 6 also protrudes downward, in the initial state, the driver 6 is pushed up to an upper standby position by the cam mechanism in the driver mechanism 3. The grip part 4 includes an electric double layer capacitor 8 as a power supply instead of a conventional general nickel-cadmium battery or nickel-hydrogen battery. The electric double layer capacitor 8 has volume and weight per electrical capacity, which are greatly smaller than the secondary battery, and can reduce the size and weight of the whole tool. Besides, it is said that the number of times of charge and discharge thereof is several hundred thousand cycles, and the lifetime is greatly longer than the conventional secondary battery, and accordingly, it can be fixed in the cordless power tool, and an attachment/detachment mechanism of a battery pack becomes unnecessary.

A charging electrode 9 is exposed at the rear end surface of the power staple gun 1, and when the power staple gun 1 is set to a cradle of a dedicated AC-DC battery recharger or a DC-DC battery recharger (not shown) with a secondary battery as a charging source, an electrode of the battery charger comes in contact with the charging electrode 9 of the power staple gun 1 and the electric double layer capacitor 8 in the power staple gun 1 is charged. Since charging of the electric double layer capacitor 8 is completed in several minutes, when a user of the power staple gun 1 carries the DC-DC battery recharger, at the time when charging is required, the charging can be performed at that place without moving from the work site. Moreover, the position and shape of the charging electrode 8 are not particularly limited. An input jack is provided in the power staple gun, and an output plug of a battery charger may be connected to the input jack to perform charging.

The structure and operation of the driver mechanism part 3 are conventionally well known, and when the contact arm 7 is pressed to a target wall surface and is pushed into the main body, a safety switch is turned on, and when a trigger lever 10 is pulled in this state, the DC motor 5 is started. The cam mechanism in the driver mechanism part 3 is rotated to release a lock of the driver 6, and the driver 6 is pushed down by spring force of a compression coil spring (not shown) and drives the first staple in the staple magazine 2 downward. After driving the staple, the driver 6 is pulled up to the standby position by the cam mechanism and is locked, the DC motor 5 is stopped, and the operation of one cycle is completed.

Figure 2:
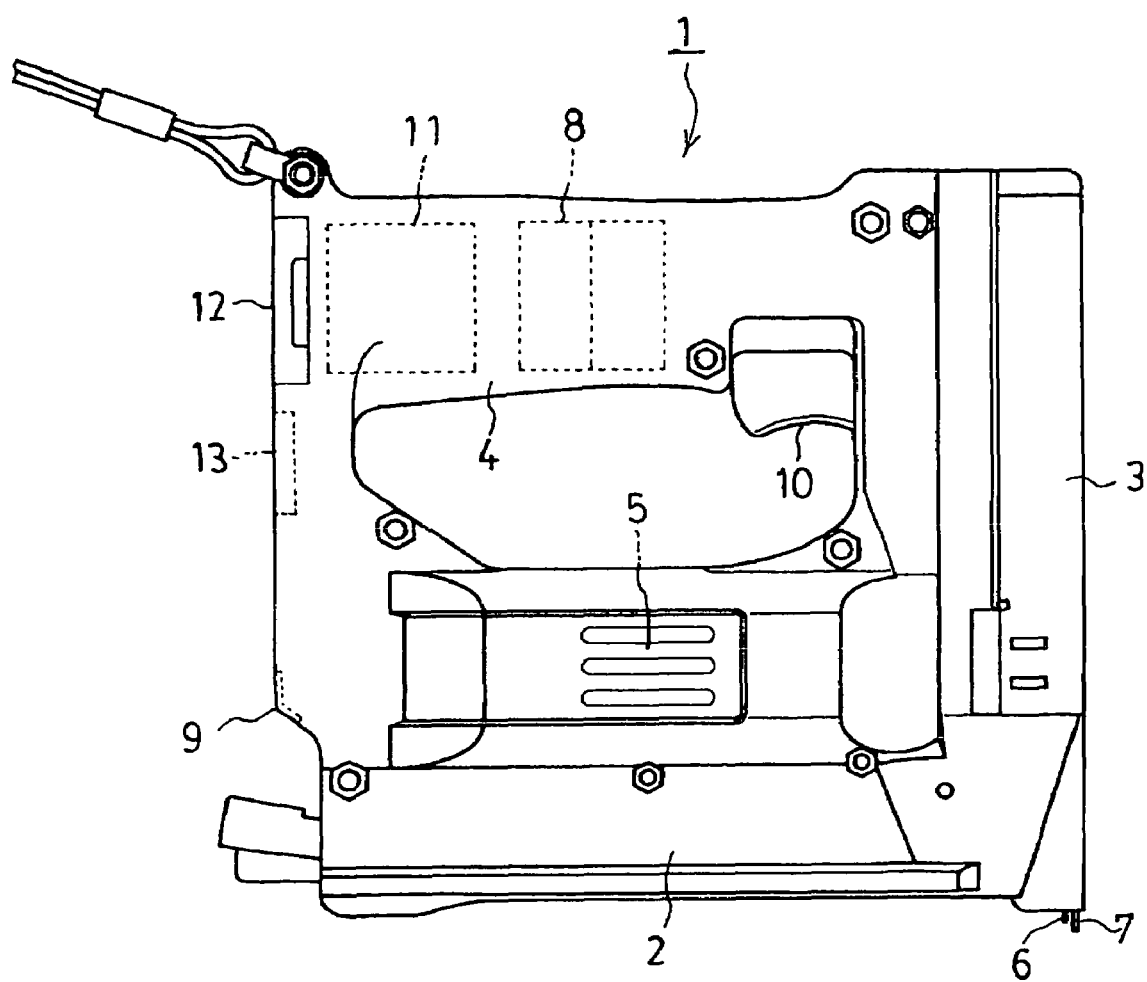
FIG. 2 shows another embodiment and is a side view of a cordless power tool.

In a power staple gun shown in FIG. 2, in addition to an electric double layer capacitor 8 as a drive power supply, a lithium-ion battery 11 is mounted as a charging power supply, and charging is performed from the lithium-ion battery 11 to the electric double layer capacitor 8. A back battery cover 12 is opened, the lithium-ion battery 11 is mounted in a battery chamber, and when a main switch 13 is turned on, charging is performed from the lithium-ion battery 11 to the electric double layer capacitor 8, and a standby state occurs. Thereafter, when the foregoing start operation by a contact arm 7 and a trigger level 10 is performed, a DC motor 5 is started by electrical charge of the electric double layer capacitor 8 and the operation of one cycle is carried out. After the end of the operation of one cycle, the DC motor 5 is stopped and the electric double layer capacitor 8 is charged.

In the case of the above structure, when a large secondary battery is mounted, the object of reducing the size and weight can not be achieved. However, by using the lithium-ion battery 11 having energy density higher than a nickel-cadmium battery or a nickel-hydrogen battery, it is possible to greatly reduce the weight as compared with a conventional cordless power tool. Although the lithium-ion battery has a high voltage (3.6 V to 3.7 V) as compared with the nickel-cadmium battery, with respect to large current discharge, it is inferior to the nickel-cadmium battery. Accordingly, although it can not be said to be suitable for the use that a large current flows as in a power tool, when it is combined with the electric double layer capacitor and is used, a power supply part which does not damage the practicability of the cordless power tool can be constructed. However, the drive voltage of many cordless power tools is generally a high voltage of 7.2 V to 24 V, and some sort of boosting means is required.

Figure 3:
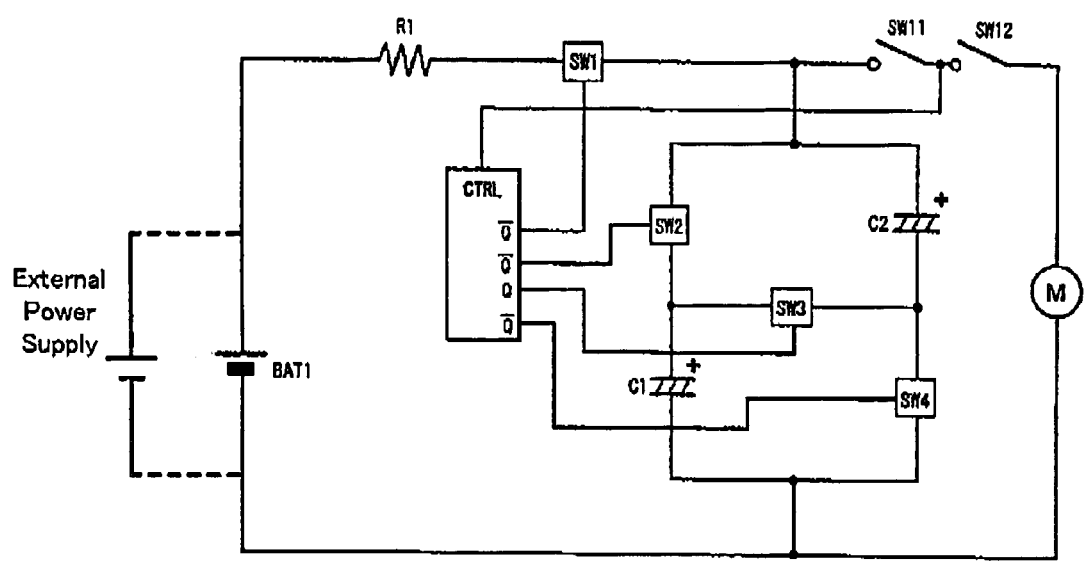
FIG. 3 is an electric circuit view of the cordless power tool of FIG. 2.

FIG. 3 shows a power supply circuit of the power staple gun 1 of FIG. 2, in which two electric double layer capacitors C1 and C2 are connected in parallel to a DC motor M, electric switches are provided at the plus side of the one electric double layer capacitor C1 and the minus side of the other electric double layer capacitor C2, respectively, and an electric switch SW3 is provided in a bridge circuit to connect the two electric double layer capacitors C1 and C2 in series to each other. The three electric switches SW2, SW3 and SW4, and an electric switch SW1 inserted between a lithium-ion battery BAT1 and the DC motor M are turned on and off by a control circuit CTRL. Incidentally, R1 denotes a current limiting resistor, SW11 denotes a safety switch operating simultaneously with the contact arm 7, and SW12 denotes a trigger switch operating simultaneously with the trigger lever 10.

FIG. 3 shows a standby state, in which the safety switch SW11 and the trigger switch SW12 are off, the control circuit CTRL turns on the electric switches SW1, SW2 and SW4 and turns off the electric switch SW3, and the lithium-ion battery BAT1 charges the two parallel electric double layer capacitors C1 and C2. For example, in the case where the lithium-ion battery of 3.7 V is used, the two electric double layer capacitors C1 and C2 are respectively charged up to a potential of 3.7 V.

Next, when the contact arm 7 is pressed to a wall surface or the like and the safety switch SW11 is turned on, the control circuit CTRL turns off the electric switches SW1, SW2 and SW4, turns on the electric switch SW3, and the two electric double layer capacitors C1 and C2 are connected in series to each other. When the trigger lever 10 is pulled and the trigger switch SW12 is turned on, current of 7.4 V is supplied from the two electric double layer capacitors C1 and C2 connected in series to each other to the DC motor M, and the power staple gun 1 performs the operation of one cycle.

After the operation is ended, when the trigger lever 10 is returned and the power staple gun 1 is separated from the wall surface or the like, the contact arm 7 goes down to the initial position, and the safety switch SW11 is turned off. Thereby, the control circuit CTRL turns off the electric switch SW3 and turns on the electric switches SW1, SW2 and SW4, the two electric double layer capacitors C1 and C2 are connected in parallel to each other, the lithium-ion battery BAT1 charges the two electric double layer capacitors C1 and C2 and the standby state occurs. Besides, although not shown, a full charge detection circuit is provided, and after charging is completed, the electric switch SW1 is turned off by the full charge detection circuit, and power consumption at the standby time may be saved. Besides, when the lithium-ion battery is discharged, as described before, the power staple gun 1 is set to a cradle of a battery charger, or the lithium-ion battery 11 is removed from the power staple gun 1, is mounted on the battery charger and is charged.

Incidentally, the invention is not limited to the above embodiment, and for example, a circuit in which the lithium-ion battery BAT1 is removed from the charging circuit of FIG. 3 may be mounted in the power staple gun 1 of FIG. 1. Various modifications can be made within the technical scope of the invention, and it is apparent that the invention covers the modifications.

INDUSTRIAL APPLICABILITY

As described above, since the cordless power tool of the invention includes the electric double layer capacitor as the power supply, the size and weight can be remarkably reduced as compared with a conventional cordless power tool having a secondary battery as a power supply. Further, since the charging time is short, the work efficiency is also improved, and since the lifetime of the electric double layer capacitor is long, the running cost is also reduced.

Moreover, the plural electric double layer capacitors are included, and the circuit is provided which switches the electric double layer capacitors so that they are connected in parallel to each other at the standby time, and are connected in series to each other at the start time. Accordingly, it is possible to provide the high performance cordless power tool which drives the motor by a high voltage several times as high as the charging power supply.

Moreover, the secondary battery to charge the electric double layer capacitor is included, so that a continuously usable time can be extended, and for example, when a small and lightweight secondary battery such as a lithium-ion battery is used, it is possible to reduce the size and weight as compared with a conventional cordless power tool including a nickel-hydrogen battery or a nickel-cadmium battery.

The invention claimed is:

1. A cordless power tool comprising:
   a plurality of electric double layer capacitors mounted in a tool main body as a power supply of a motor and recharge able by an external power supply;
   a charging electrode provided in the tool main body;
   a contact arm;
   a safety switch that is turned on when the contact arm is pressed;
   a trigger lever; and
   a trigger switch that is turned on when the trigger lever is pulled;
   when the safety switch and the trigger switch are off, the plurality of electrical double layer capacitors are connected in parallel,
   when the safety switch is turned on, the plurality of electric double layer capacitors are connected in series, and
   when the safety switch and the trigger switch are turned on, current is supplied from the plurality of electric double layer capacitors connected in series to the motor.

2. The cordless power tool according to claim 1, further comprising:
   a secondary battery when the safety switch and the trigger switch are off, the electric double layer capacitors are charged by the secondary battery or the external power supply.

3. The cordless power tool according to claim 2, wherein the secondary battery is a lithium-ion battery.

4. A cordless power tool comprising:
   a plurality of electric double layer capacitors mounted in a tool main body as a power supply of a motor and rechargeable by an external power supply;
   a charging electrode provided in the tool main body;
   a series parallel switching circuit that switches the plurality of electric double layer capacitors into parallel connection when a start switch is off, and switches the plurality of electric double layer capacitors into series connection when the start switch is on;
   a contact arm;
   a safety switch that is turned on when the contact arm is pressed;
   a trigger lever; and
   a trigger switch that is turned on when the trigger lever is pulled;
   when the safety switch and the trigger switch are off, the plurality of electric double layer capacitors are connected in parallel,
   when the safety switch is turned on, the plurality of electric double layer capacitors are connected in series, and
   when the safety switch and the trigger switch are turned on, current is supplied from the plurality of electric double layer capacitors connected in series to the motor.

5. The cordless power tool according to claim 4, further comprising:
   a secondary battery disposed in parallel to the electric double layer capacitors,
   when the start switch is off, the electric double layer capacitors are charged by the secondary battery or the external power supply, and
   when the start switch is on, current is supplied from the electric double layer capacitors to the motor.

6. The cordless power tool according to claim 5, wherein the secondary battery is a lithium-ion battery.

* * * * *